(12) United States Patent
Bachl et al.

(10) Patent No.: US 7,643,539 B2
(45) Date of Patent: Jan. 5, 2010

(54) MULTI-PATH EQUALIZER CONFIGURATION TECHNIQUE

(75) Inventors: Rainer W. Bachl, Nuremberg (DE); Peter C. Gunreben, Moehrendorf (DE); Mirko Schacht, Nuremberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 550 days.

(21) Appl. No.: 11/414,465

(22) Filed: Apr. 28, 2006

(65) Prior Publication Data

US 2007/0253470 A1    Nov. 1, 2007

(51) Int. Cl.
*H04B 1/69* (2006.01)
*H04B 1/707* (2006.01)
*H04B 1/713* (2006.01)

(52) U.S. Cl. .................. 375/148; 375/144; 375/234; 375/233; 375/349

(58) Field of Classification Search .................. 375/144, 375/148, 233, 234, 349
See application file for complete search history.

(56) References Cited

U.S. PATENT DOCUMENTS

| 6,259,730 | B1 * | 7/2001 | Solondz ........................ 375/232 |
| 7,116,998 | B2 * | 10/2006 | Wang et al. .................. 455/506 |
| 7,333,532 | B2 * | 2/2008 | Baltersee et al. ............. 375/148 |
| 7,406,122 | B2 * | 7/2008 | Shimobayashi et al. ...... 375/233 |
| 2003/0114125 | A1 * | 6/2003 | Sourour et al. ............... 455/133 |

* cited by examiner

*Primary Examiner*—Phuong Phu
(74) *Attorney, Agent, or Firm*—Carlson, Gaskey & Olds, P.C.

(57) ABSTRACT

A technique for arranging a receiver device (20) includes equally spacing adjacent rake receivers (26-30) within an observation window (OW). A disclosed technique for updating an observation window includes changing the position of one of the rake fingers (24, 30) while maintaining a position of other ones of the rake fingers. The disclosed technique for arranging rake fingers in a receiver device (20) does not depend on searching and tracking channel conditions and reduces computational complexity without sacrificing receiver performance.

14 Claims, 3 Drawing Sheets

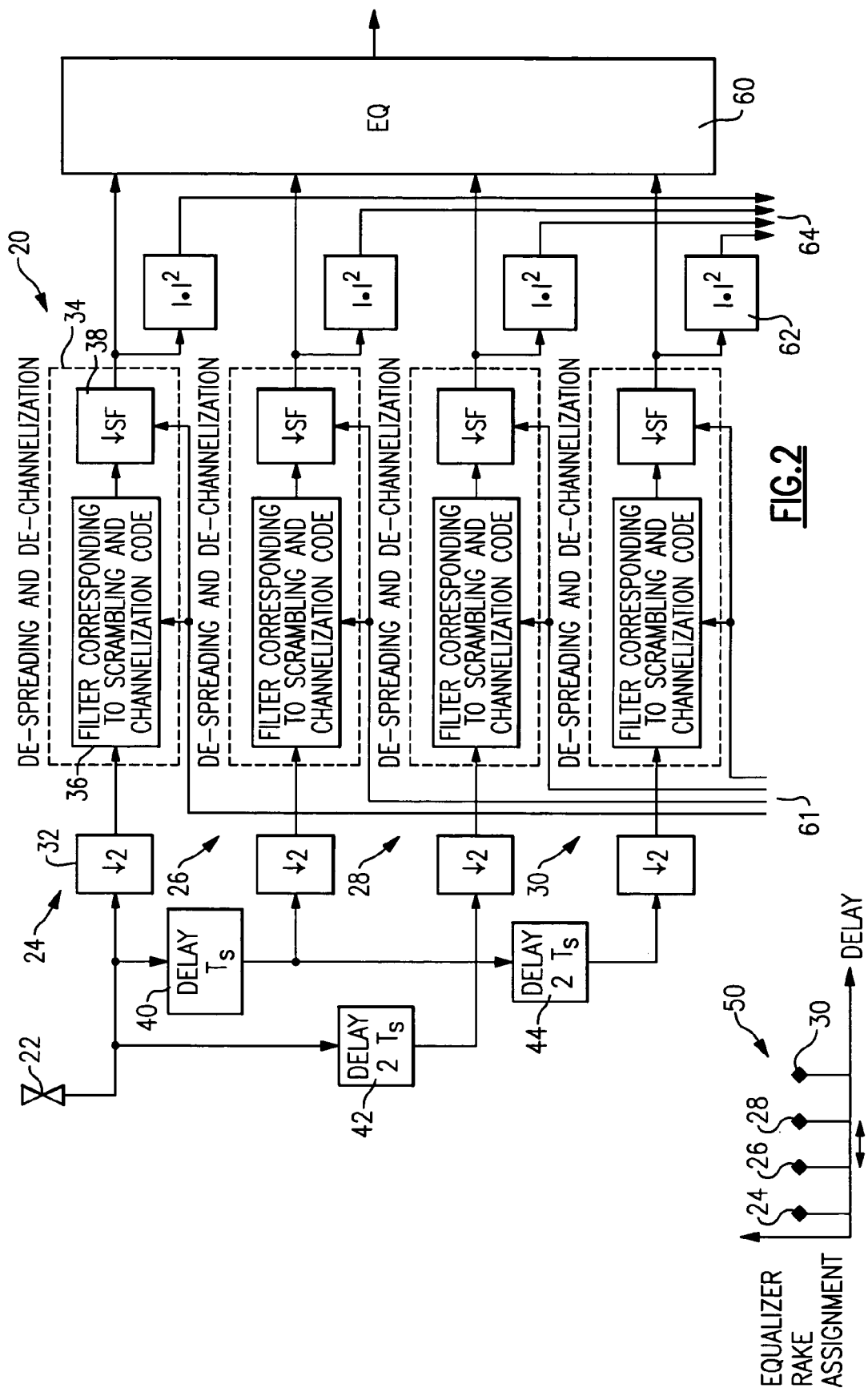

MULTI-PATH EQUALIZER CONFIGURATION TECHNIQUE

FIELD OF THE INVENTION

This invention generally relates to communications. More particularly, this invention relates to wireless communication.

DESCRIPTION OF THE RELATED ART

Wireless communications are used in a variety of situations. For communications in cellular networks, there is a need for a variety of receiving devices that receive wirelessly transmitted signals. One type of receiver is known as a rake receiver, which includes a plurality of rake fingers arranged to provide a desired performance. Rake receivers operate in a well known manner. Arranging the rake fingers in such a receiver is typically based upon the properties of the wireless propagation channel.

Two properties that have to be addressed for most situations are the propagation delay, which is caused by the distance between the transmitter and the receiver, and the delay spread, which is caused by the multi-path channel.

A well-known device for compensating for delay spread is a so-called equalizer. In advanced CDMA receivers, for example, an equalizer is typically applied before the de-spreading stage. Computing equalizer filter coefficients requires knowledge of the channel co-efficients of the wireless communication channel. In a CDMA system, for example, the channel coefficients can be obtained by a channel estimation algorithm, which usually operates on de-spreaded pilot symbols in the control channel.

Measuring the timing properties of the wireless channel is usually accomplished using a correlator unit acting as a searcher on the control channel containing the pilot symbols. The searcher obtains the channel energy response of the multi-path channel. FIG. 1A schematically shows an example channel energy response 10. FIG. 1B shows a corresponding rake finger assignment 12 where a rake finger is assigned to each delay of the detected multi-path. Comparing FIG. 1A and FIG. 1B, for example, shows the correspondence between the position of the rake finger arrangement 12 and the position of the delays of the detected multi-path. While such an approach has proven useful for many situations, there are drawbacks.

For example, an equalizer must have knowledge of the channel coefficients for making appropriate determinations. De-spreading and channel estimation introduce some latency in the signal processing chain. Accordingly, the output of the channel estimation algorithm is typically not time-aligned with the input signal from the antenna. If an equalizer is placed before a de-spreader, the time delay of the channel estimates must be compensated by including a buffer such as a first in, first out (FIFO) buffer in front of the equalizer or the receiver performance will suffer from the timing-misalignment.

Moreover, it is computationally intense to have the searcher or correlator unit monitoring the control channel. Implementing such a searcher requires significant processing power when realized through software and a significant amount of logic when realized through hardware. In either event, the realization is relatively costly and causes high power consumption.

There is a need for a more efficient arrangement for processing received signals in wireless communication systems. This invention addresses that need.

SUMMARY OF THE INVENTION

An exemplary method of configuring a receiver includes equally spacing each of a plurality of rake fingers from an adjacent one of the rake fingers.

In the disclosed example, the equal spacing comprises a selected amount of time. In one example, the amount of time is less than an inverse of a received signal bandwidth.

A disclosed example includes determining a relationship between power at the plurality of rake fingers and time. An observation window containing the equally spaced rake fingers can be adjusted responsive to the determined relationship according to selected criteria.

An exemplary receiver device includes a plurality of rake fingers having an equal spacing between each rake finger and an adjacent one of the rake fingers.

The various features and advantages of this invention will become apparent to those skilled in the art from the following detailed description. The drawings that accompany the detailed description can be briefly described as follows.

BRIEF DESCRIPTION OF THE DRAWINGS

FIG. 2 schematically shows an example receiver device designed according to an embodiment of this invention.

FIG. 3 schematically shows a rake finger arrangement that is useful in an embodiment of this invention.

DETAILED DESCRIPTION

Figure 1A:
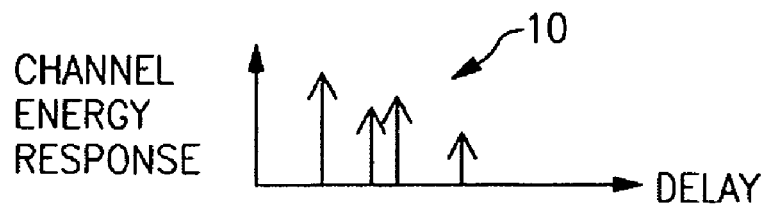
FIG. 1A schematically shows an example channel energy response.
Figure 1B:
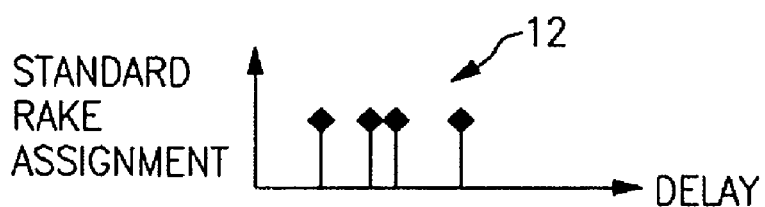
FIG. 1B schematically shows a rake finger arrangement according to a prior art technique.

The following examples demonstrate how equally spacing rake fingers using a constant or uniform timing separation between rake fingers for processing a received signal reduces computational complexity and facilitates more efficient signal processing.

FIG. 2 schematically shows an example receiver device 20 including an antenna 22 for receiving at least one signal. The example receiver device 20 includes four rake fingers 24, 26, 28 and 30. The rake finger 24, for example, includes a portion 32 for down sampling a received signal. In this example, each portion 32 performs down sampling by two. A de-spreading and de-channelization portion 34 includes a filter 36 and a down sampling portion 38. In this example, the filter 36 corresponds to scrambling and channelization codes. The down sampling portion 38 in this example down samples by the spreading factor using a known technique.

The rake fingers 24-30 are separated from each other in time and each of the rake fingers is equally spaced from an adjacent one of the rake fingers. The example of FIG. 2 includes a functional block 40 that corresponds to a spacing $T_s$, which corresponds to a selected amount of time between the rake fingers 24 and 26. Another functional block 42 introduces a spacing $2T_s$ between the rake finger 24 and the rake finger 28. Accordingly, a spacing $T_s$ exists between the rake fingers 26 and 28. Another functional block 44 introduces a spacing $2T_s$ in addition to that provided by the functional block 40 such that the rake finger 30 is separated from the rake finger 28 by $T_s$.

FIG. 3 schematically shows a rake finger configuration 50 consistent with the example of FIG. 2. In this example, each of the rake fingers 24, 26, 28 and 30 is spaced from an adjacent one of the rake fingers by a spacing $T_s$. The equal spacing $T_s$ between the rake fingers does not depend on tracking delays on a detected multi-path and then assigning the positions of the rake fingers. Instead, equally spaced rake fingers are arranged for processing a received signal. The spacing $T_s$ is selected independent of the type of searching and tracking that has otherwise been required.

Selecting the $T_s$ spacing between the rake fingers may vary to meet the needs of a particular situation. In one example, a three quarter chip spacing is used between the rake fingers. The spacing $T_s$ need not be an integer fraction of the chip duration. One example technique for selecting the spacing $T_s$ includes ensuring that the spacing between the rake fingers is smaller than the inverse of the signal bandwidth of the received signal.

In the example of FIG. 3, the rake fingers 24-30 are spaced within an observation window shown at OW. The length of the observation window in this example is $3T_s$. For receiver devices having K rake fingers, the observation window length OW will be $(K-1)T_s$.

Assigning the positions of the rake fingers in this manner reduces the computational complexity of a receiver device, in part, because it is no longer necessary to track the channel for determining how to position rake fingers. The size of the observation window in general will depend on the delay spread, which depends on the cell size and the environment.

An example like that shown in FIGS. 2 and 3 is especially useful for relatively small cells or so-called microcells because the delay spread is small and there is less variation in the propagation delay under such circumstances. Given this description, those skilled in the art will realize how to implement an embodiment of this invention to meet the needs of their particular situation including selecting an appropriate observation window size and appropriate spacing between the rake fingers.

Referring again to FIG. 2, this example includes an equalizer portion 60 that uses a known technique for processing the received signal back to its original form after the de-spreading and de-channelization, for example. An equalizer in this position of such a receiver device is unique.

The example of FIG. 2 also includes timing control at 61 for known reasons and functional blocks 62 that provide power measurement information at 64 that is useful for updating the observation window. If a linear type equalizer is used, the power measurement for single rake fingers can be alternatively approximated by taking the magnitude squares of the equalizer weights, for example.

The equalizer in one example is a linear type such as an LMMSE. In another example, the equalizer 60 is a non-linear type such as a decision-feedback-equalizer or a maximum likelihood-equalizer. The power measurements schematically shown at 64 in FIG. 2 are useful, for example, with non-linear type equalizers.

Adjusting the observation window can be useful for maintaining a desired relationship between a center of energy of a received signal and a center of the observation window. For discussion purposes, consider a notation k for each of the rake fingers, a finger timing $t_k$ and a power measurement for each of the rake fingers $P_k$. Assuming that the timing for the earliest or first in time of the rake fingers $\tau_e$ is provided by another instance of the receiver (e.g., from the preamble detector), at the start of reception the timing of all rake fingers is initialized using the following relationship:

$$[t_1, t_2, \ldots, t_K] = [\tau_e, \tau_e + T_s, \tau_e + 2T_s, \ldots \tau_e + (K-1)T_s]$$

Based on the power measurements $P_k$ provided by the rake fingers 24-30, the center of energy over time $\tau_p$ can be determined from the following equation:

$$\tau_p = \frac{\sum_{k=1}^{K} P_k t_k}{\sum_{k=1}^{K} P_k}$$

The center of rake finger timing $\tau_r$ can be determined from the following equation:

$$\tau_R = \frac{1}{K}\sum_{k=1}^{K} t_k = \min_k(t_k) + \frac{K-1}{2}T_s$$

In this example, the previous equation provides a mean result because $\tau_e$ does not necessarily start at zero. This example compensates for such a situation.

Depending on a determined relationship between power at the plurality of rake fingers and time, the observation window may be adjusted. In one example, if the center of energy over time and the center of the rake finger timing differ by more than a selected threshold, the observation window will be adjusted. In one example, the selected threshold is one-half of the timing separation $T_s$ (i.e., $T_s/2$).

Figure 4:
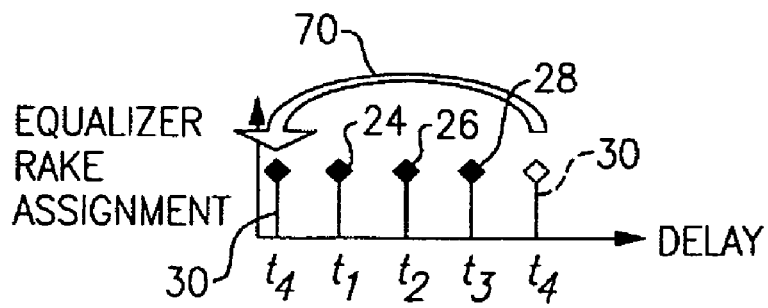
FIG. 4 schematically shows an example technique for adjusting an observation window in an embodiment of this invention.

FIG. 4 schematically shows an example where the difference between the center of energy and the center of the rake finger timing exceeds the selected threshold and the observation window is adjusted by changing the position of the rake finger 30. In this example, the rake finger 30 is the last in time of the rake fingers of the original observation window. The position of the rake finger 30 is changed to become the first in time of the rake fingers in the adjusted observation window. In other words, the rake finger 30 is essentially moved as schematically shown at 70 into a position at the beginning of the adjusted observation window.

Figure 5:
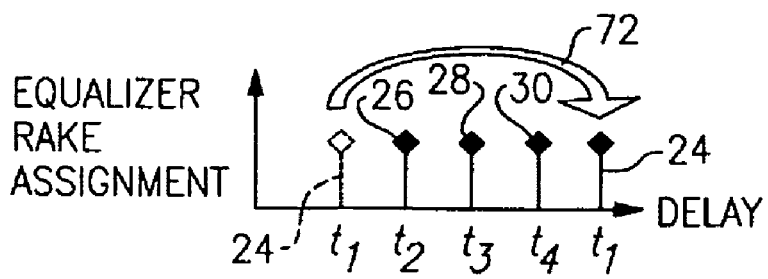
FIG. 5 schematically shows another observation window adjustment technique.

One example includes using the following relationship $$\tau_P - \tau_R < -T_s/2 \text{ then } t_1 := t_1 - KT_s \text{ where } 1 = \text{argmax}\{t_k\}$$

for making an adjustment as schematically shown in FIG. 4. The following relationship $$\tau_P - \tau_R > T_s/2 \text{ then } t_e := t_e + KT_s \text{ where } e = \text{argmin}\{t_k\}$$

is used in an example to adjust the observation window in a manner schematically shown in FIG. 5. In this example, as schematically shown at 72, the rake finger 24, which was the first in time of the rake fingers in the observation window, is moved behind (in time) the rake finger 30, which was the last in time of the rake fingers in the observation window. The adjusted observation window includes the second in time of the rake fingers (i.e., rake finger 26) as the first in time of the rake fingers in the adjusted observation window. The rake finger 24 becomes the last in time of the rake fingers within the adjusted observation window.

One example includes determining whether to adjust the observation window every frame (e.g., every 10 m sec). Given this description those skilled in the art will be able to select appropriate timing.

An advantage to the techniques shown in FIGS. 4 and 5 is that in either situation three of the four rake fingers remain in the same position. Leaving rake fingers in the same position reduces computation and processing required for resetting fingers. By only changing the position of one of the rake fingers, the observation window can be adjusted to achieve a desired performance while keeping the computational complexity at a minimum. Additionally, the channel estimation filters and measurement averaging buffers need not be reset for fingers remaining at the same position. This avoids otherwise potential performance loss during the initialization phase of rake fingers. This is a significant advantage compared to the standard procedure where rake finger positions have to be continually estimated based upon continually tracking the delays on a channel.

Figure 7:
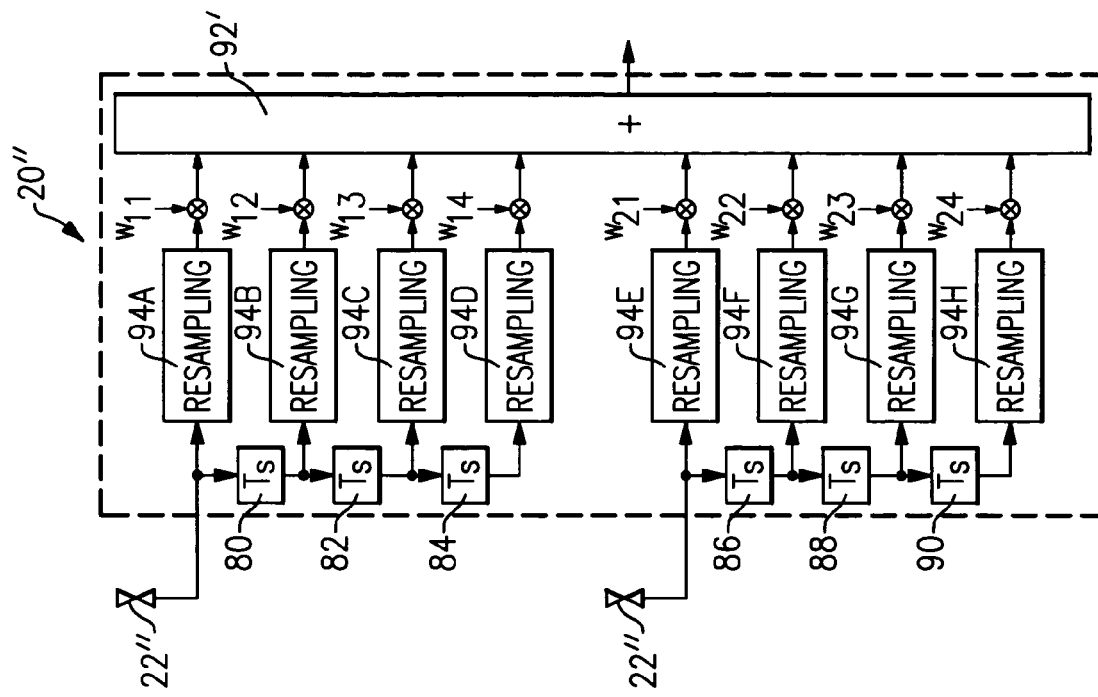
FIG. 7 schematically shows another example receiver device designed according to an embodiment of this invention.
Figure 6:
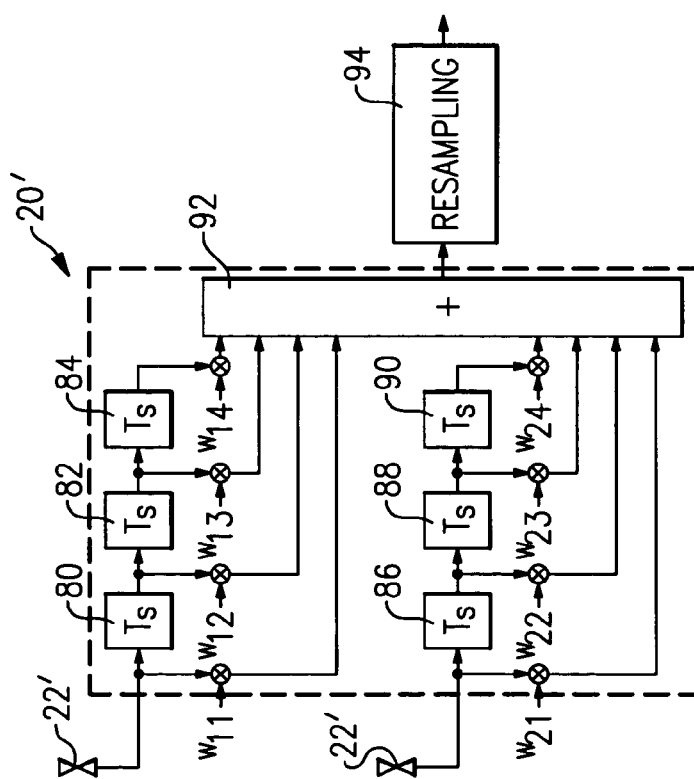
FIG. 6 schematically illustrates another example receiver device employing an equalizer before despreading from a known signal processing technique.

FIG. 6 schematically shows an advanced example receiver device 20' employing an equalizer before the despreading stage from a known signal processing technique. In this example, functional blocks 80, 82, 84, 86, 88 and 90 represent the spacing between rake fingers such that the rake fingers are equally spaced. One difference between the example of FIG. 6 and that of FIG. 2 is that the example of FIG. 6 utilizes a linear combiner 92 followed by a resampling module 94. An example linear combiner is a linear equalizer. One example includes an LMMSE equalizer. The re-sampling module 94 performs down sampling from the sampling rate to the actual symbol rate. Another example is shown in FIG. 7 where a receiver device 20" includes a plurality of re-sampling modules 94A-94H in front of the linear combiner 92'. In the examples of FIGS. 6 and 7, the output samples are at the symbol rate.

The disclosed examples provide several advantages. The output of the channel estimation is not time-aligned to the input signal from the antenna. Therefore, when placing the equalizer after the de-spreader, only the latency of the channel estimation has to compensated for. It becomes possible to employ a FIFO buffer for compensating for such latency, which operates on the symbol rate. Because the symbol rate of a de-spreaded signal is much lower than the double chip rate, the amount of memory required for such a FIFO buffer is much lower than was previously possible. Accordingly, the disclosed examples reduce complexity while still allowing for optimum performance.

Another advantage of the disclosed examples is that assigning the rake fingers with a constant or equal timing separation between them creates an observation window. Maintaining the timing separation below the inverse of the signal bandwidth provides a useful timing separation between rate fingers. With such an observation window, it is no longer necessary to search and track the position of every single multi-path. The observation window of the disclosed examples renders searcher and per-finger trackers used in conventional rake receivers redundant. This provides significant savings in terms of computations in the receiver. Again, computational complexity is significantly reduced but optimum performance is still achievable.

For situations where the observation window is larger than the maximum delay spread, which will occur in most small cells, the observation window can be updated as described above. The disclosed example is very simple to implement in terms of computational complexity and is very efficient. Additionally, it allows for maintaining at least some of the rake fingers in a constant position, which reduces complexity and prevents performance losses for otherwise resetting them.

Changing only one rake finger at a time to update the observation window depending on a desired direction of the timing update is also advantageous. The disclosed example technique is particularly useful for situations that rely on medium to long-term measurements of the rake fingers. In such arrangements, the averaging buffers and measurements that otherwise need to be restarted for a rake finger when it is reassigned can be reduced. The disclosed example adjustment technique for updating an observation window reduces the number of re-assignments to a minimum and further reduces computational complexity of a receiver device.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of configuring a receiver, comprising:
providing the receiver with a plurality of rake fingers;
equally spacing each of the plurality of rake fingers from an adjacent one of the rake fingers;
determining a relationship between power at the plurality of rake fingers and time; and
adjusting an observation window containing the equally spaced rake fingers responsive to the determined relationship.

2. The method of claim 1, wherein the spacing comprises a selected amount of time.

3. The method of claim 2, comprising
selecting the amount of time to be less than an inverse of a received signal bandwidth.

4. The method of claim 2, comprising
using K rake fingers, where K is an integer; and
using an observation window that has a duration that is (K1)*(the selected amount of time) for processing a received signal.

5. The method of claim 1, comprising:
changing a time position of a beginning of the observation window.

6. The method of claim 5, comprising
keeping a time position of at least some of the rake fingers constant; and
changing a time position of at least a first one in time of the rake fingers.

7. The method of claim 6, comprising at least one of
moving a last one in time of the rake fingers in front of the first one in time of the rake fingers such that the last one in time of the rake fingers is at the time position of the beginning of the adjusted observation window; or
moving the first one in time of the rake fingers behind the last one in time of the rake fingers such that a second one in rime of the rake fingers is at the time position of the beginning of the adjusted observation window and the first in time of the rake fingers is near an end of the adjusted observation window.

8. The method of claim 1, comprising
determining a center of the power over time.

9. The method of claim 8, comprising
determining a center of the power over time from a power associated with each of the rake fingers;

determining a center of timing of the rake fingers; and adjusting the observation window if the determined center of energy and the determined center of timing differ by more than a selected amount.

10. The method of claim 9, wherein the selected amount is one half the spacing between the rake fingers.

11. A receiver device, comprising:

a plurality of rake fingers having an equal spacing between each rake finger and an adjacent one of the rake fingers, the receiver device using an observation window for processing a received signal, the observation window being adjusted responsive to a determined relationship between power at the plurality of rake fingers and time.

12. The receiver device of claim 11, wherein the equal spacing comprises a selected amount of time.

13. The receiver device of claim 12, wherein the selected amount of time is less than an inverse of a received signal bandwidth.

14. The receiver device of claim 11, comprising

K rake fingers, where K is an integer; and the observation window has a duration that is (K1)*(the equal spacing).

\* \* \* \* \*

UNITED STATES PATENT AND TRADEMARK OFFICE
CERTIFICATE OF CORRECTION

PATENT NO. : 7,643,539 B2
APPLICATION NO. : 11/414465
DATED : January 5, 2010
INVENTOR(S) : Bachl et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Sixteenth Day of November, 2010

David J. Kappos
*Director of the United States Patent and Trademark Office*